(12) United States Patent
Shirakawa et al.

(10) Patent No.: US 8,742,866 B2
(45) Date of Patent: Jun. 3, 2014

(54) ELECTROMAGNETIC COUPLER AND INFORMATION COMMUNICATION DEVICE INCLUDING SAME

(75) Inventors: Yohei Shirakawa, Hitachi (JP); Naoto Teraki, Takahagi (JP)

(73) Assignee: Hitachi Metals, Ltd., Tokyo (JP)

( * ) Notice: Subject to any disclaimer, the term of this patent is extended or adjusted under 35 U.S.C. 154(b) by 481 days.

(21) Appl. No.: 13/080,356

(22) Filed: Apr. 5, 2011

(65) Prior Publication Data

US 2012/0032761 A1    Feb. 9, 2012

(30) Foreign Application Priority Data

Aug. 6, 2010  (JP) ................................ 2010-177181

(51) Int. Cl.
*H01P 5/02*    (2006.01)
*H01G 2/22*    (2006.01)

(52) U.S. Cl.
CPC ... *H01P 5/02* (2013.01); *H01G 2/22* (2013.01)
USPC .......................... 333/24 C; 333/24 R; 361/271

(58) Field of Classification Search
CPC ................................. H01P 5/02; H01G 2/22
USPC ................. 333/12, 24 R, 116, 24 C; 361/271
See application file for complete search history.

(56) References Cited

U.S. PATENT DOCUMENTS 7,518,465 B2 *    4/2009  Savic et al. ................. 333/24 R
2011/0151805 A1 *  6/2011  Hayashi et al. ................. 455/84

FOREIGN PATENT DOCUMENTS

JP    2006-121315    5/2006
JP    2008-099236    4/2008
JP    4345851        10/2009

* cited by examiner

*Primary Examiner* — Benny Lee
*Assistant Examiner* — Rakesh Patel
(74) *Attorney, Agent, or Firm* — Antonelli, Terry, Stout & Kraus, LLP.

(57) ABSTRACT

An electromagnetic coupler including a conductor pattern formed in a first conductor layer, a feed pattern connected to a feeding system and a ground pattern separated from the feed pattern. The feed pattern and the ground pattern are formed in a second conductor layer parallel to the first conductor layer. A first linear conductor and a plurality of second linear conductors are formed perpendicularly to the first and the second conductor layers. The first linear conductor connects the conductor pattern and the feed pattern. The plurality of second linear conductors connects the conductor pattern and the ground pattern. In addition, the conductor pattern is symmetrical in shape with respect to the connection point between the conductor pattern and the first linear conductor. The plurality of second linear conductors are symmetrical in position with respect to the first linear conductor in a planar view.

4 Claims, 5 Drawing Sheets (a)

(b)

(a)

(b)

(a)

(b)

ELECTROMAGNETIC COUPLER AND INFORMATION COMMUNICATION DEVICE INCLUDING SAME

CLAIM OF PRIORITY

The present application claims priority from Japanese patent application serial no. 2010-177181 filed on Aug. 6, 2010, the content of which is hereby incorporated by reference into this application.

BACKGROUND OF THE INVENTION

1. Field of the Invention

The present invention relates to electromagnetic couplers suitable for use in wireless communication systems to transfer information between information communication devices disposed at a short distance from each other via an electrostatic field or an induced electric field. The present invention also relates to information communication devices equipped with the electromagnetic couplers.

2. Description of Related Art

Conventional electromagnetic couplers include one disclosed in JP-B 4345851. This electromagnetic coupler (high-frequency coupler) is formed by connecting a plate-like electrode to a series inductor and a parallel inductor via a high-frequency transmission line. Such an electromagnetic coupler is to be disposed in an information communication device, such as a transmitter and a receiver. In the cases where a transmitter and a receiver are disposed so that the electrodes of their electromagnetic couplers face each other, when the distance between the two electrodes is $2\lambda/15$ or smaller of the wavelength $\lambda$ of the frequency used, the two electrodes are coupled by the electrostatic field component of longitudinal waves to behave as one capacitance and like a band pass filter as a whole, making it possible to efficiently communicate information between the two electromagnetic couplers. Also, when the distance between the two electrodes is in the range from $2\lambda/15$ to $8\lambda/15$ of the wavelength $\lambda$ of the frequency used, information can be transferred by using an induced electric field of longitudinal waves.

Meanwhile, when the distance between the electromagnetic couplers is greater than a certain value, information cannot be transferred. As a result, other wireless devices do not suffer interference from electromagnetic waves generated from the electromagnetic couplers, and a wireless communication system in which information communication devices equipped with the electromagnetic couplers are used does not suffer interference from other wireless communication systems. Because of these characteristics, wireless communication systems in which the conventional electromagnetic coupler is used make it possible, by using an electrostatic field or an induced electric field of longitudinal waves over a short distance, to communicate a large volume of data between information communication devices by using the UWB (Ultra Wide Band) communication system, in which wide band signals are used.

More specifically, in the electromagnetic coupler described in JP-B 4345851, a through hole formed in a cylindrical dielectric is filled with a conductor, and a conductor pattern to be used as an electrode is formed on the top surface of the cylindrical dielectric. This cylindrical dielectric is mounted on a printed circuit board provided with a conductor pattern to be used as a high frequency transmission line, which is connected to the electrode via the conductor inside the through hole. The conductor inside the through hole substitutes for the above-mentioned series inductor, and the high frequency transmission line and a ground pattern are connected via a parallel inductor. When this electromagnetic coupler is fed with power, longitudinal waves of an electric field occur in the direction parallel to the conductor inside the through hole (the electric current flowing through the conductor inside the through hole). By using the longitudinal waves, information can be transferred.

Electromagnetic couplers are built into personal computers, cellular phones, digital cameras, etc. to transmit and receive data including moving images. Since electromagnetic couplers are built into small devices such as cellular phones and digital cameras, there is a strong demand for thinner electromagnetic couplers.

In the case of the electromagnetic coupler described in JP-B 4345851, however, the cylindrical dielectric needs to be shortened in order to obtain a thinner electromagnetic coupler. Then, the conductor inside the through hole becomes shorter, which means the electric field it generates becomes smaller. As a result, the longitudinal waves of the electric field also become smaller, causing a problem of a lower coupling strength between an electromagnetic coupler on the transmitter side and another electromagnetic coupler on the receiver side.

This lower coupling strength between the electromagnetic coupler on the transmitter side and the electromagnetic coupler on the receiver side means that information cannot be transferred when the distance between the two couplers is long. Also, even a small shift in the positions of the two electromagnetic couplers can disrupt the transmission of information, thus narrowing the coupling range.

In addition, in the electromagnetic coupler described in JP-B 4345851, a thinner electromagnetic coupler means its electrode approaches the ground. As a result, the impedance characteristics (characteristics of impedance with respect to frequency) become steep, while the input impedance of its feeding system is kept constant. This causes a problem of a narrower available frequency band (namely, a frequency band in which the matching condition between an electromagnetic coupler and its feeding system is favorable).

Also in the electromagnetic coupler described in JP-B 4345851, when the distance between the electrodes of two electromagnetic couplers is $2\lambda/15$ or smaller of the wavelength $\lambda$ of the frequency used, information can be efficiently communicated between the electromagnetic couplers by forming a band pass filter. Unfortunately, however, when the match between the two electromagnetic couplers is not favorable, signal transmission efficiency is degraded.

On the other hand, in the case of wireless communications carried out by using devices provided with this electromagnetic coupler described in JP-B 4345851, for example, a cover or a case of each device including a dielectric exists between the electromagnetic couplers, resulting in variations in the dielectric constant between the electromagnetic couplers. Then, variations occur in the value of the capacitance between the electrodes of the two electromagnetic couplers and in the frequency characteristics of the band pass filter, which in some cases may degrade the information transmission characteristics in the frequency band of interest. Even if these expected variations in the dielectric constant in some cases are taken into account in designing the electromagnetic couplers, in the case of wireless communications carried out by using other devices made of different materials and/or differently designed, the value of the dielectric constant between the electromagnetic couplers varies, which similarly degrades the information transmission characteristics in the frequency band of interest.

Also, in the electromagnetic coupler described in JP-B 4345851, when the distance between the electrodes of the two electromagnetic couplers is in the range from $2\lambda/15$ to $8\lambda/15$ of the wavelength $\lambda$ of the frequency used, information is communicated by using the induced electric field component of longitudinal waves. In this case, when the relative position of the two electromagnetic couplers and the environment are kept constant, the information transmission characteristics depend on matching conditions between the electromagnetic couplers and the feeding system. In other words, the signal intensity from the electromagnetic couplers to the communication module including the feeding system increases under a favorable matching condition, while the signal intensity from the electromagnetic couplers to the communication module including the feeding system decreases under a poor matching condition.

Accordingly, in the electromagnetic coupler described in JP-B 4345851, electromagnetic couplers must be designed so that a band pass filter is formed when the distance between the electromagnetic couplers (between the two electrodes) is $2\lambda/15$ or smaller of the wavelength $\lambda$ of the frequency used, and that the matching condition becomes favorable when the distance between the electromagnetic couplers is in the range from $2\lambda/15$ to $8\lambda/15$ of the wavelength $\lambda$ of the frequency used. Therefore, in the case of an insufficient signal intensity when the distance between the electromagnetic couplers is in the range from $2\lambda/15$ to $8\lambda/15$ of the wavelength $\lambda$ of the frequency used, for example, a redesign is required with a view to forming a band pass filter when the distance between the electromagnetic couplers is $2\lambda/15$ or smaller of the wavelength $\lambda$ of the frequency used. This means that much time and effort is required in designing the electromagnetic couplers. In addition, when the frequency band to be used is broad, it is required to obtain a large number of frequencies in which the matching condition is suitable, which means that even more time and effort is required.

SUMMARY OF THE INVENTION

In view of the foregoing, it is an objective of the present invention to provide a thin electromagnetic coupler with which a higher coupling strength and a larger coupling range can be obtained in a broad frequency band, and to provide an information communication device including such an electromagnetic coupler.

Furthermore, it is another objective of the present invention to provide an electromagnetic coupler whose information transmission characteristics are equivalent to those in the conventional art and hardly affected by variations in the dielectric constant between electromagnetic couplers.

In addition, it is yet another objective of the present invention to provide an electromagnetic coupler having information transmission characteristics equivalent to those in the conventional art with which matching adjustments with a feeding system and frequency band adjustments can be easily made. Besides, the electromagnetic coupler according to the invention is aimed at near-field communications and it is desired that no communications be made between two electromagnetic couplers over a long distance exceeding a certain value.

(I) According to one aspect of the present invention, there is provided an electromagnetic coupler, which includes:

a conductor pattern formed in a first conductor layer;

a feed pattern formed in a second conductor layer parallel to the first conductor layer, the feed pattern being connected to a feeding system;

a ground pattern formed separately from the feed pattern in the second conductor layer, the ground pattern being grounded;

a first linear conductor formed perpendicularly to the first conductor layer and the second conductor layer, the first linear conductor connecting the conductor pattern and the feed pattern; and a plurality of second linear conductors formed perpendicularly to the first conductor layer and the second conductor layer, the plurality of second linear conductors connecting the conductor pattern and the ground pattern. In addition, the conductor pattern is symmetrical in shape with respect to the connection point between the conductor pattern and the first linear conductor; and the plurality of second linear conductors are symmetrical in position with respect to the first linear conductor in a planar view.

(II) According to another aspect of the present invention, there is provided an information communication device including an electromagnetic coupler for communicating information by using at least one of an electrostatic field and an induced electric field, the electromagnetic coupler including:

a conductor pattern formed in a first conductor layer;

a feed pattern formed in a second conductor layer parallel to the first conductor layer, the feed pattern being connected to a feeding system;

a ground pattern formed separately from the feed pattern in the second conductor layer, the ground pattern being grounded;

a first linear conductor formed perpendicularly to the first conductor layer and the second conductor layer, the first linear conductor connecting the conductor pattern and the feed pattern; and a plurality of second linear conductors formed perpendicularly to the first conductor layer and the second conductor layer, the plurality of second linear conductors connecting the conductor pattern and the ground pattern. In addition, the conductor pattern is symmetrical in shape with respect to a connection point between the conductor pattern and the first linear conductor; and the plurality of second linear conductors are symmetrical in position with respect to the first linear conductor in a planar view.

In the above aspects (I) and (II) of the present invention, the following modifications and changes can be made:

(i) The first conductor layer is one side of a printed circuit board; the second conductor layer is the other side of the printed circuit board; and each of the first linear conductor and the second linear conductors is a conductor formed inside a through hole formed in the printed circuit board.

(ii) The printed circuit board has a relative dielectric constant of 4.0 to 5.0 and a thickness of $6\lambda/1000$ to $45\lambda/1000$ with respect to a wavelength $\lambda$ of a central frequency of a frequency band of interest of the electromagnetic coupler; a distance from the connection point between the conductor pattern and the first linear conductor to a connection point between the conductor pattern and each of the second linear conductors is from $75\lambda/1000$ to $225\lambda/1000$; and the conductor pattern is configured into a shape of a square with a side ranging from $225\lambda/1000$ to $450\lambda/1000$ in length.

(iii) The ground pattern is configured around the feed pattern; and the conductor pattern is arranged to face the feed pattern and the ground pattern.

Advantages of the Invention

According to the present invention, it is possible to provide a thin electromagnetic coupler with which a higher coupling strength and a larger coupling range can be obtained in a broad frequency band, and an information communication device including such an electromagnetic coupler.

Also, according to the invention, it is possible to provide an electromagnetic coupler whose information transmission characteristics are equivalent to those in the conventional art and hardly affected by variations in the dielectric constant between electromagnetic couplers, and an information communication device including such an electromagnetic coupler.

Moreover, according to the invention, it is possible to provide an electromagnetic coupler having information transmission characteristics equivalent to those in the conventional art with which matching adjustments with a feeding system and frequency band adjustments can be easily made, and an information communication device including such an electromagnetic coupler.

BRIEF DESCRIPTION OF THE DRAWINGS

FIG. 1(a) shows a plan view of a first conductor layer of the electromagnetic coupler; and FIG. 1(b) shows a perspective plan view of a second conductor layer of the electromagnetic coupler as viewed from the first conductor layer side.

FIG. 7(a) shows a plan view of a first conductor layer of the electromagnetic coupler; and FIG. 7(b) shows a perspective plan view of a second conductor layer of the electromagnetic coupler as viewed from the first conductor layer side.

DETAILED DESCRIPTION OF THE PREFERRED EMBODIMENTS

A preferred embodiment of the present invention will be described hereinafter with reference to the accompanying drawings. The invention is not limited to the specific embodiments described below, but various modifications and combinations are possible without departing from the spirit and scope of the invention.

Figure 1:
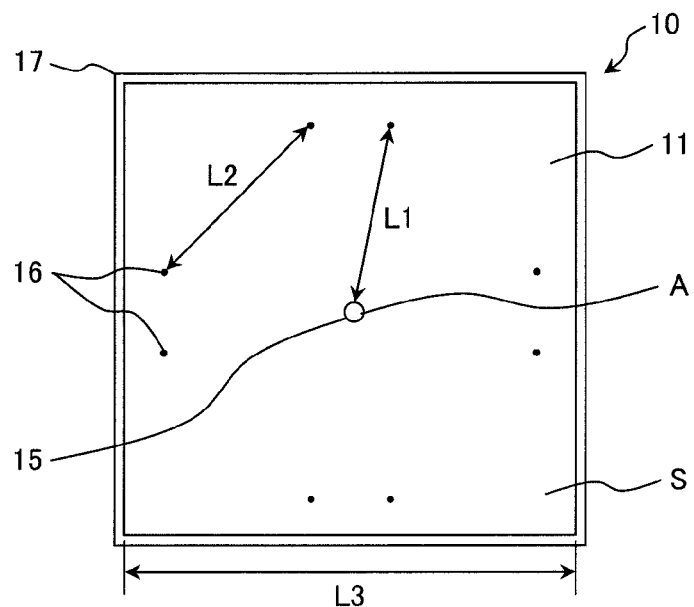
FIG. 1 is schematic illustrations of an electromagnetic coupler in accordance with an embodiment of the present invention.
Figure 1:
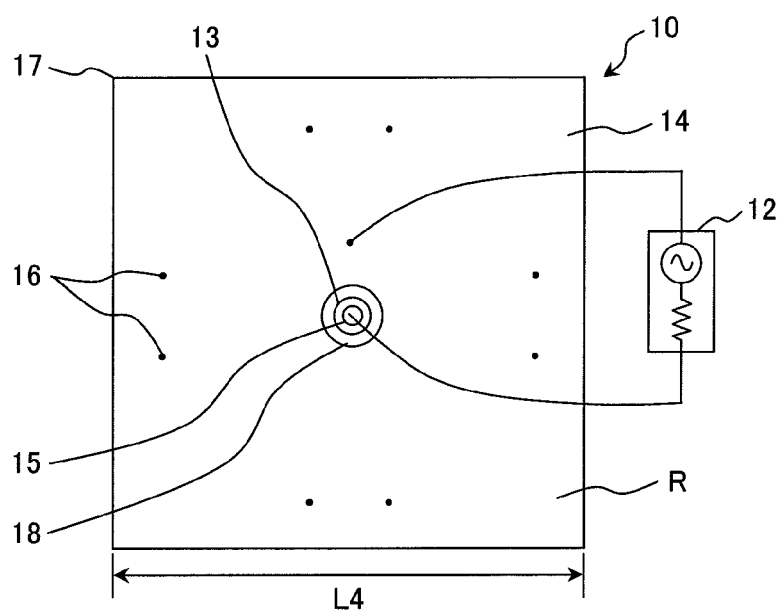

FIG. 1 is schematic illustrations of an electromagnetic coupler in accordance with an embodiment of the present invention. More specifically, FIG. 1(a) shows a plan view of a first conductor layer of the electromagnetic coupler; and FIG. 1(b) shows a perspective plan view of a second conductor layer of the electromagnetic coupler as viewed from the first conductor layer side.

As shown in FIGS. 1(a) and 1(b), an electromagnetic coupler 10 in accordance with an embodiment of the present invention includes: a conductor pattern 11 formed in a first conductor layer; a feed pattern 13 formed in a second conductor layer parallel to the first conductor layer and connected to a feeding system 12; a ground pattern 14 formed separately from the feed pattern 13 in the second conductor layer and grounded; a first linear conductor 15 connecting the conductor pattern 11 and the feed pattern 13; and a plurality of second linear conductors 16 connecting the conductor pattern 11 and the ground pattern 14.

In the present embodiment, a two-layer printed circuit board 17 is used so that wiring patterns can be formed on both sides of the printed circuit board 17. The conductor pattern 11 is formed on one side (hereinafter referred to as "front side" or "first conductor layer") S of the two-layer printed circuit board 17, and the feed pattern 13 and the ground pattern 14 are formed on the other side (hereinafter referred to as "back side" or "second conductor layer") R of the two-layer printed circuit board 17. Here, a square-shaped FR4 (Flame Retardant Type 4) glass epoxy printed circuit board is used for the two-layer printed circuit board 17.

The feed pattern 13 is configured in a circle in a planar view in the central portion of the second conductor layer R of the printed circuit board 17. The ground pattern 14 is configured in a square in a planar view around the feed pattern 13 across a gap 18 formed around the feed pattern 13. In other words, the ground pattern 14 covers the backside R of the printed circuit board 17 entirely except for the feed pattern 13 and the gap 18.

The conductor pattern 11 is formed on the front side S of the printed circuit board 17 such that it faces the feed pattern 13 and the ground pattern 14. The conductor pattern 11 is configured in a square that is a little smaller than the size of the printed circuit board 17. In other words, the conductor pattern 11 is configured in a square that is a little smaller than the ground pattern 14. However, the conductor pattern 11 may be formed in a square that is as large as the ground pattern 14.

The first linear conductor 15 and the plurality of second linear conductor patterns 16 are formed perpendicularly to the front side (first conductor layer) S and the backside (second conductor layer) R of the printed circuit board 17. Each of these linear conductors 15 and 16 is a conductor formed inside a through hole (not shown) formed in the printed circuit board 17. This conductor may be formed such that it fills the through hole or it thinly covers an interior surface of the through hole.

The first linear conductor 15 is connected to the center (in a planar view) of the feed pattern 13 on one end and to the center (in a planar view) of the square conductor pattern 11 on the other end. As a result, the feed pattern 13 and the conductor pattern 11 are electrically connected via the first linear conductor 15. The conductor pattern 11 is symmetrical in shape with respect to a connection point A with the first linear conductor 15.

The plurality of second linear conductors 16 are connected to the ground pattern 14 on one end and to the conductor pattern 11 on the other end. As a result, the ground pattern 14 and the conductor pattern 11 are electrically connected via the plurality of second linear conductors 16.

The plurality of second linear conductors 16 is formed symmetrically in position in a planar view with respect to the first linear conductor 15. In the present embodiment, a total of eight second linear conductors 16, two each in the proximity of each of the four sides of the square conductor pattern 11, are formed. These eight second linear conductors 16 are symmetrical in position with respect to the first linear conductor 15 in a planar view, and also are symmetrical in position from top to bottom and from right to left. In addition, the eight second linear conductors 16 are formed such that each connection point between the conductor pattern 11 and the second linear conductors 16 is located at the same distance L1 from the connection point A between the conductor pattern 11 and the first linear conductor 15.

When a printed circuit board with a relative dielectric constant from 4.0 to 5.0 is used for the printed circuit board 17, the thickness T of the printed circuit board 17 is from 6λ/1000 to 45λ/1000 with respect to a wavelength λ of a central frequency of a frequency band of interest of the electromagnetic coupler. Also, the distance L1 from the connection point A between the conductor pattern 11 and the first linear conductor 15 to each of the connection points between the conductor pattern 11 and the second linear conductors 16 is from 75λ/1000 to 225λ/1000, and the conductor pattern 11 is configured into a shape of a square with a side ranging from 225λ/1000 to 450λ/1000 in length. In addition, the shortest distance L2 from the two second linear conductors 16 disposed in the proximity of one of two adjacent sides of the conductor pattern 11 to the two second linear conductors 16 disposed in the proximity of the other side is from 75λ/1000 to 225λ/1000, and the length L4 of each side of the ground pattern 14 is equal to the length L3 of each side of the conductor pattern 11 or larger. These dimensions are required to obtain an input impedance with which a favorable matching condition of the electromagnetic coupler 10 can be achieved.

More specifically, when the central frequency of a frequency band used is 4.5 GHz, for example, it is desirable that the printed circuit board 17 have a relative dielectric constant of 4.4 and a thickness T of 1.6 mm, and that the electromagnetic coupler 10 have the dimensions shown in FIGS. 2(a) and 2(b). FIG. 2(a) and FIG. 2(b) show one example of the dimensions (unit: mm) of the electromagnetic coupler of FIGS. 1(a) and 1(b), respectively. Although the thickness T of the printed circuit board 17 is set at 1.6 mm here, it may be set at 1 mm or smaller by adjusting other dimensions.

Power can be fed from the feeding system 12 to the electromagnetic coupler 10 by a coaxial cable, for example. The center conductor of the coaxial cable is connected to the feed pattern 13, and the outer conductor of the coaxial cable is connected to the ground pattern 14.

Feeding power from the feeding system 12 to the electromagnetic coupler 10 allows electric currents to flow through the first linear conductor 15, the conductor pattern 11, and the plurality of second linear conductors 16, causing the longitudinal wave component of an electric field to radiate from the currents through the plurality of second linear conductors 16 in the direction parallel to the second linear conductors 16 (in the direction perpendicular to the conductor pattern 11). The amplitude of the longitudinal wave component is in a positive correlation with the matching condition between the electromagnetic coupler 10 and the feeding system 12.

The workings of the electromagnetic coupler 10 will be described hereinafter.

There are a longitudinal wave ($E_r$) and a traverse wave ($E_\theta$) in an electric field generated by an infinitesimal dipole (Il, current I and electrical length l). The longitudinal wave ($E_r$) and the traverse wave ($E_\theta$) are expressed by the following equations (1) and (2), respectively (see, e.g., non-patent literature 1). Non-patent literature 1: "SMALL AND PLANAR ANTENNAS" by Misao Haneishi et al., published by The Institute of Electronics, Information and Communication Engineers, pp. 22-23.

$$E_r = \frac{Il}{2\pi}\exp(-jk_0 r)\left\{\frac{\eta_0}{r^2} + \frac{1}{jw\varepsilon_0 r^3}\right\}\cos\theta \qquad \text{Eq. (1)}$$

$$E_\theta = \frac{Il}{4\pi}\exp(-jk_0 r)\left\{\frac{jw\mu_0}{r} + \frac{\eta_0}{r^2} + \frac{1}{jw\varepsilon_0 r^3}\right\}\sin\theta \qquad \text{Eq. (2)}$$

In these equations, assuming three-dimensional coordinate (X-axis, Y-axis, and Z-axis), Il represents an infinitesimal dipole passing through the origin 0 and existing along the Z-axis; $\eta_0$ represents the characteristic impedance; $E_r$ represents the longitudinal wave at the observation point P; $E_\theta$ represents the traverse wave at the observation point P; r represents a distance from the infinitesimal dipole Il to the observation point P; $k_0$ represents the wave number; j represents an imaginary unit; w represents the angular frequency; $\varepsilon_0$ represents the dielectric constant of a vacuum; $\mu_0$ represents the permeability constant of a vacuum; and θ represents the angle between the Z-axis (infinitesimal dipole) and the observation point P.

In Eqs. (1) and (2), the components in inverse proportion to the distance r (term including 1/r) represents a radiation electric field, the components in inverse proportion to the square of the distance r (term including $1/r^2$) represent induced electric fields, and the components in inverse proportion to the cube of the distance r (term including $1/r^3$) represent electrostatic fields. Therefore, it is recognized that the traverse wave $E_\theta$ is composed of a radiation electric field, an induced electric field, and an electrostatic field, and that the longitudinal wave $E_r$ is composed of only an induced electric field and an electrostatic field.

Since a radiation electric field is inversely proportional to the distance r, it extends farther without attenuation than an induced electric field in inverse proportion to the square of the distance r and an electrostatic field in inverse proportion to the cube of the distance r. This means that a radiation electric field can interfere with other systems. Therefore, in the electromagnetic coupler 10 in accordance with the present invention, information is communicated by using the longitudinal wave $E_r$ that does not include the radiation electric field component while controlling the traverse wave $E_\theta$.

In the electromagnetic coupler 10 of the invention, the second linear conductors 16 are formed such that they are symmetrical in position with respect to the first linear conductor 15 in a planar view. As a result, electric currents of the same magnitude flow in the opposite direction to each other, canceling traverse waves generated by the conductor pattern 11. Also, in the electromagnetic coupler 10, the length of the second linear conductors 16 (namely the thickness T of the printed circuit board 17) can be reduced, to 1 mm or shorter, for example, making it possible to diminish traverse waves occurring perpendicularly to the second linear conductors 16. Accordingly, it is possible to control traverse waves including a radiation electric field that can interfere with other systems.

As the length of the second linear conductors 16 diminishes, longitudinal waves originating from the second linear conductors 16 also diminish. In the electromagnetic coupler 10, however, the amplitude of longitudinal waves that occur in the electromagnetic coupler 10 as a whole can be maintained by increasing the number of the second linear conductors 16 (eight linear conductors in this embodiment), which are the source of longitudinal waves. As a result, a high coupling strength can be maintained.

In general, as a conductor pattern approaches a ground pattern in an electromagnetic coupler, the impedance characteristics become steeper, which would have caused a problem with a narrower available frequency band in other electromagnetic couplers. However, in the electromagnetic coupler 10 of the present invention, because the conductor pattern 11 and the ground pattern 14 are electrically connected via the second linear conductors 16, these second linear conductors 16 operate as so-called short stubs. As a result, the impedance characteristics are kept gradual, and the available frequency band can be kept wide even when the conductor pattern 11 and the ground pattern 14 are disposed in close proximity to each other.

For example, in the electromagnetic coupler disclosed in JP-B 4345851, the electrode is not grounded. Therefore, this electromagnetic coupler can be called an open-stub electromagnetic coupler. According to JP-A 2006-121315, the input admittance Y of an open stub can be expressed by the following equation (3):

$$Y = Y_0 \tanh(\gamma l) = Y_0 \tanh(\alpha \beta l + j\beta l) \quad \text{Eq. (3)}$$
$$= Y_0 \frac{\sinh 2\alpha\beta l + j\sin 2\beta l}{\cosh 2\alpha\beta l + \cos 2\beta l}$$
$$= Y_0 \frac{\sinh \alpha\theta + j\sin\theta}{\cosh \alpha\theta + \cos\theta}$$
$$\theta \equiv \beta l$$

Herein, when "$0<\alpha\theta\ll 1$" is satisfied, and "$\theta=(2m-1)\pi+\delta\theta$" and "$|\delta\theta|\ll 1$" are also satisfied, the input admittance Y can be approximated by the following equation (4):

$$Y \approx Y_0 \frac{\alpha\theta - j\{\theta - (2m-1)\pi\}}{1 + \frac{(\alpha\theta)^2}{2} - 1 + \frac{\{\theta - (2m-1)\pi\}^2}{2}} \approx \quad \text{Eq. (4)}$$
$$2Y_0 \frac{\alpha\theta - j\{\theta - (2m-1)\pi\}}{(\alpha\theta)^2 + j\{\theta - (2m-1)\pi\}^2}$$

In these equations, $Y_0$ represents the characteristic admittance, $\alpha$ represents the loss constant, $\beta$ represents the wave number, l represents the electrical length, and m represents a positive integer. Since a small electromagnetic coupler is desirable, m=1.

As shown by Eq. (4), in the input admittance Y of an open stub, the real part takes on an external value, and the imaginary part takes on 0 when $\theta$ is in the neighborhood of $(2m-1)\pi$.

Meanwhile, in the electromagnetic coupler 10 of the present invention, the conductor pattern 11 is grounded as described before. Therefore, the electromagnetic coupler 10 can be called a short-stub electromagnetic coupler. According to JP-A 2006-121315, the input admittance Y of a short stub can be expressed by the following equation (5):

$$Y = Y_0 \coth(\gamma l) = Y_0 \coth(\alpha\beta l + j\beta l) \quad \text{Eq. (5)}$$
$$= Y_0 \frac{\sinh 2\alpha\beta l - j\sin 2\beta l}{\cosh 2\alpha\beta l - \cos 2\beta l}$$
$$= Y_0 \frac{\sinh \alpha\theta - j\sin\theta}{\cosh \alpha\theta - \cos\theta}$$
$$\theta \equiv \beta l$$

Herein, when "$0<\alpha\theta\ll 1$" is satisfied, and "$\theta=2m\pi+\alpha\theta$" and "$|\delta\theta|\ll 1$" are also satisfied, the input admittance Y can be approximated by the following equation (6):

$$Y \approx Y_0 \frac{\alpha\theta - j(\theta - 2m\pi)}{1 + \frac{(\alpha\theta)^2}{2} - 1 + \frac{(\theta - 2m\pi)^2}{2}} \approx 2Y_0 \frac{\alpha\theta - j(\theta - 2m\pi)}{(\alpha\theta)^2 + j(\theta - 2m\pi)^2} \quad \text{Eq. (6)}$$

As shown by Eq. (6), in the input admittance Y of a short stub, the real part takes on an external value, and the imaginary part takes on 0 when $\theta$ is in the neighborhood of $2m\pi$.

In comparison between Eq. (4) and Eq. (6), it is recognized that the slopes of the real part and the imaginary part of the input admittance Y with respect to $\theta$ are smaller in Eq. (6), which expresses the input admittance Y of a short stub. Therefore, as compared to conventional open-stub electromagnetic couplers, in the electromagnetic coupler 10 of the present invention, which is a short-stub electromagnetic coupler, the impedance characteristics are gradual, and the available frequency band is kept wide even when the conductor pattern 11 and the ground pattern 14 are disposed in close proximity to each other.

Next, results and discussions of an experiment for an electromagnetic coupler in accordance with the present invention will be described hereinafter. The electromagnetic coupler of the invention used in an experiment was formed with an FR4 double-side (two-layer) board of 1.6 mm in thickness, and the other dimensions of the electromagnetic coupler used are shown in FIGS. 2(*a*) and 2(*b*).

Figure 2:
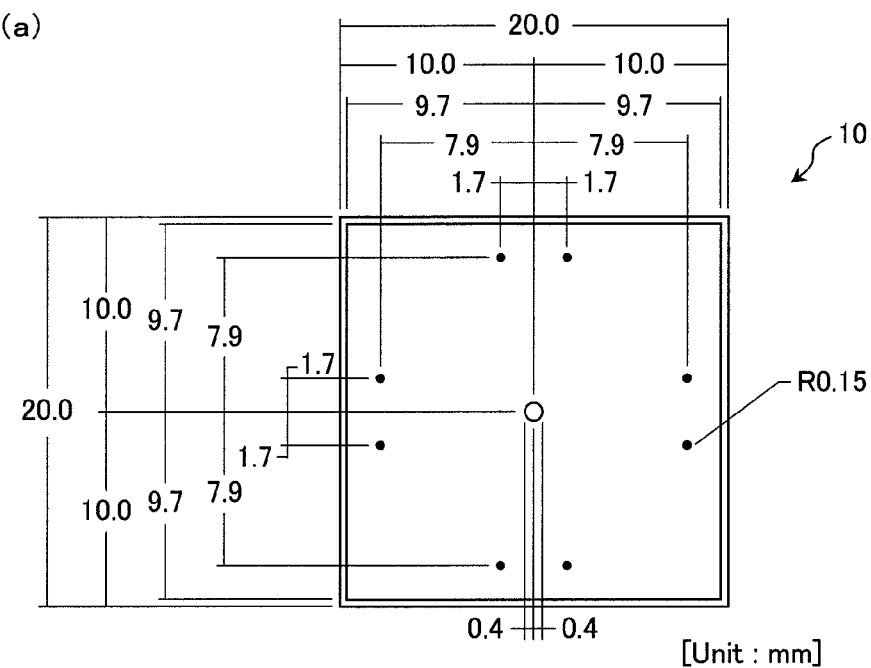
FIG. 2(a) and FIG. 2(b) show one example of the dimensions (unit: mm) of the electromagnetic coupler of FIGS. 1(a) and 1(b), respectively.
Figure 2:
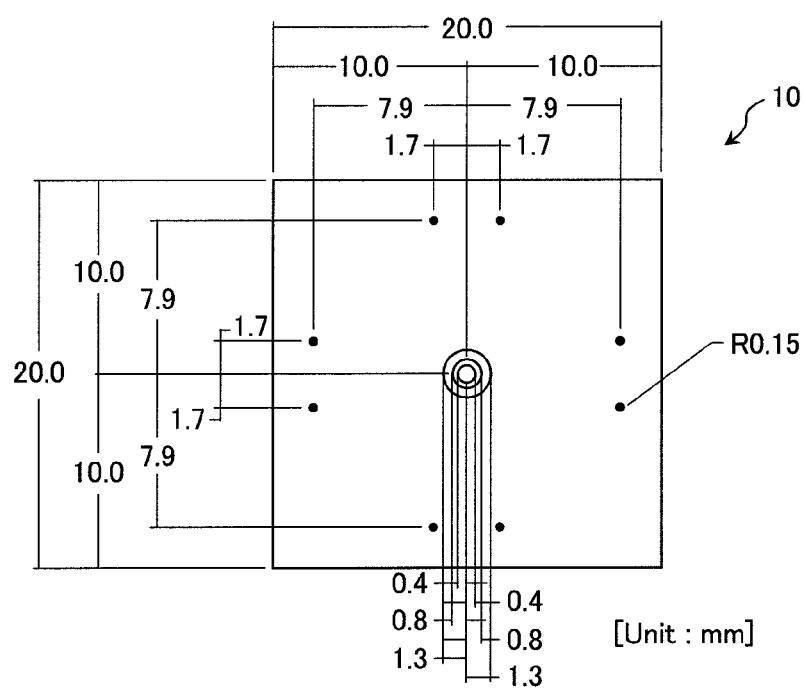
Figure 3:
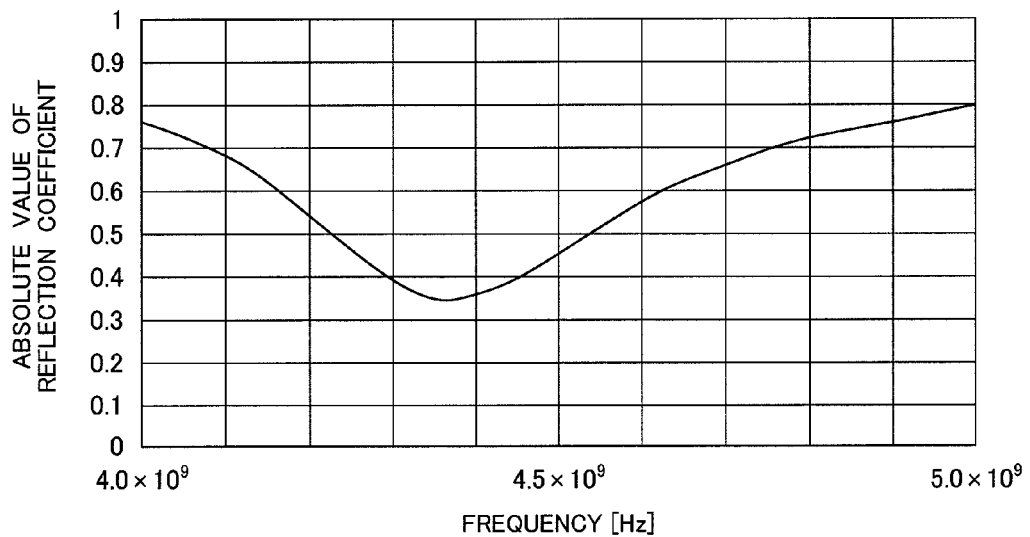
FIG. 3 is a graph showing an experimental result on the relationship between frequency and absolute value of the reflection coefficient of the electromagnetic coupler of FIG. 2.

FIG. 3 a graph showing an experimental result on the relationship between frequency and absolute value of the reflection coefficient of the electromagnetic coupler of FIG. 2. The absolute value of the reflection coefficient was measured using a network analyzer. According to the experimental results shown in FIG. 3, the absolute value of the reflection coefficient is 0.7 or smaller in the frequency ranging from 4.08 GHz to 4.75 GHz. It is verified that the electromagnetic coupler in accordance with the present embodiment has broadband frequency characteristics.

Figure 5:
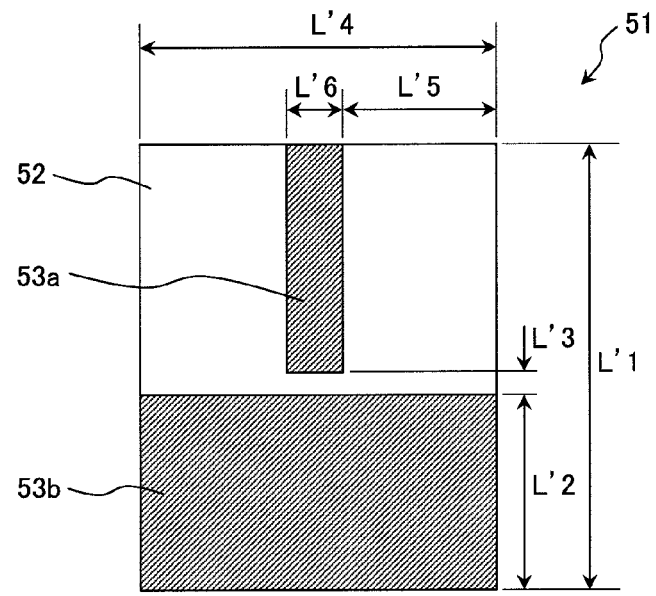
FIG. 5 is a schematic illustration showing a plan view of a conventional monopole antenna used in an experiment.

Next, was investigated a relationship between an input power-output power ratio and a distance between two electromagnetic couplers in accordance with the present embodiment and between two conventional monopole antennas. This experiment used the same electromagnetic couplers as the ones used in the experiment shown in FIG. 3. This experiment also used conventional monopole antennas shown in FIG. 5, as a comparative example. FIG. 5 is a schematic illustration showing a plan view of a conventional monopole antenna used in an experiment.

As shown in FIG. 5, a monopole antennas 51 are composed of a printed circuit board 52 and two rectangular conductors 53*a* and 53*b* formed on a surface of the printed circuit board 52. The two rectangular conductors 53*a* and 53*b* are separated from each other. The rectangular conductor 53*a* operates as a radiation conductor, and the rectangular conductor 53*b* operates as a ground. The rectangular conductors 53*a* and 53*b* are fed with power. The monopole antenna 51 was formed with an FR4 one-side board of 2.4 mm in thickness. In FIG. 5, L'1=22.0 mm, L'2=10.0 mm, L'3=1.0 mm, L'4=20.0 mm, L'5=9.5 mm, and L'6=1.0 mm. The monopole antenna 51 is one of commonly used antennas and applied to wireless communications carried out by using traverse waves.

Figure 6:
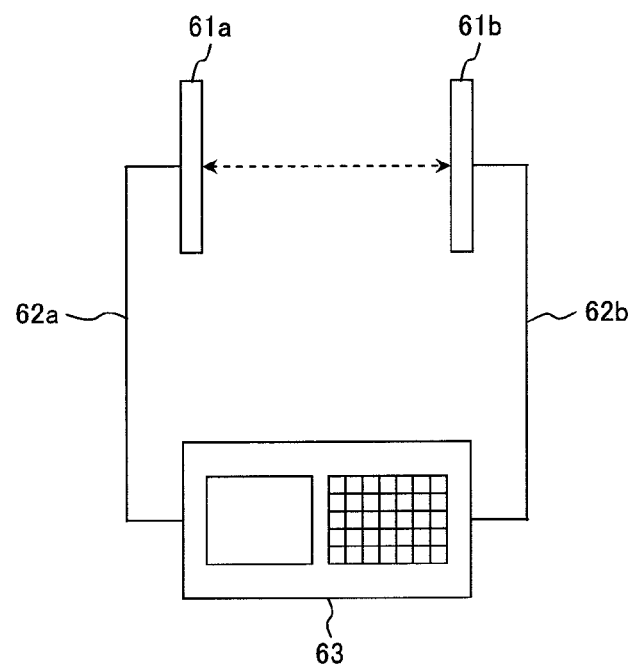
FIG. 6 is a schematic illustration showing an experimental method for measuring an input power-output power ratio of specimens.

Next, the experimental system will be described hereinafter with reference to FIG. 6. FIG. 6 is a schematic illustration showing an experimental method for measuring an input power-output power ratio of specimens. In this experiment, two specimens 61*a* and 61*b* to be measured, namely the two electromagnetic couplers shown in FIG. 2 or the two monopole antennas 51 shown in FIG. 5, were disposed such that they faced each other in parallel with a certain distance, and a perpendicular passing through the center of one specimen 61a passed through the center of the other specimen 61b. Also, the specimens 61a and 61b were connected to two terminals of a network analyzer 63 via coaxial cables 62a and 62b, respectively. A ratio of the input power from one specimen 13a to one terminal of the network analyzer 63 to the output power from the other terminal of the network analyzer 63 to the other specimen 13b (i.e., the absolute value of S21), namely the input power-output power ratio of the electromagnetic couplers faced each other or the monopole antennas 51 faced each other was evaluated.

Figure 4:
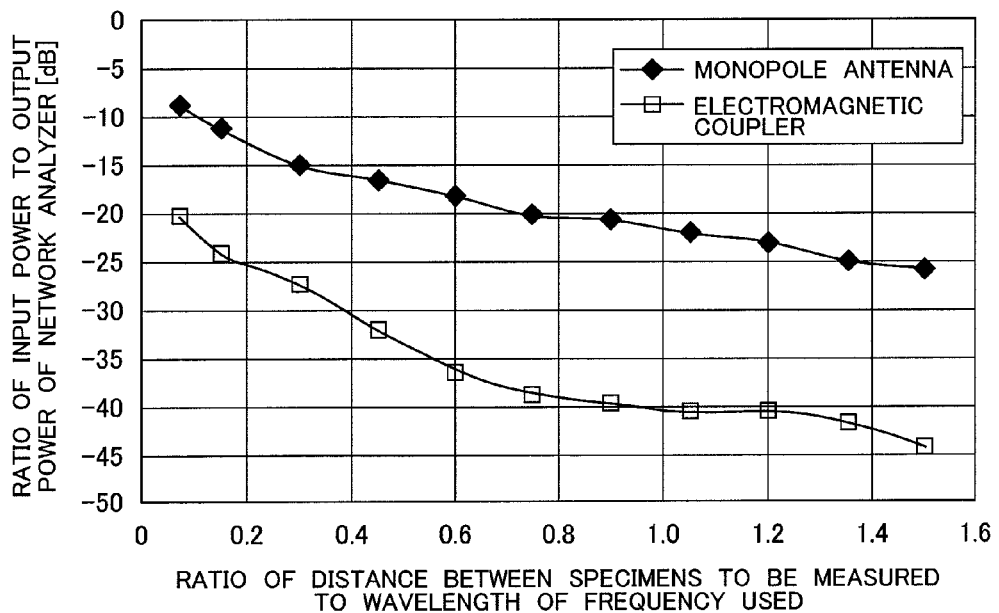
FIG. 4 is a graph showing an experimental result of on the relationship between an input power-output power ratio and a distance between the two electromagnetic couplers shown in FIG. 2 and between two conventional monopole antennas shown in FIG. 5.

FIG. 4 is a graph showing an experimental result on the relationship between an input power-output power ratio and a distance between the two electromagnetic couplers shown in FIG. 2 and between the two monopole antennas shown in FIG. 5. In the experiment, the frequency of the signals used was 4.5 GHz, and the horizontal axis of the graph in FIG. 4 represents the ratio of the distance between the specimens 61a and 61b to the wavelength in this frequency used.

As shown in FIG. 4, in the electromagnetic coupler in accordance with the present embodiment, wireless communications are carried out by using longitudinal waves, with which the amount of attenuation with respect to distance is larger than that with traverse waves. As a result, the slope of the absolute value of S21 with respect to the distance is larger than that with the monopole antenna 51, with which wireless communications are carried out by using traverse waves. For example, when the ratio of the distance between the specimens 61a and 61b to the wavelength is around 0.7, the absolute value of S21 of the electromagnetic coupler of FIG. 2 is about −38 dB as compared to about −19 dB with the monopole antenna 51. Meanwhile, as the ratio of the distance between the specimens 61a and 61b to the wavelength decreases, the difference in the absolute value of S21 between the electromagnetic coupler of FIG. 2 and the monopole antenna 51 decreases. This indicates that the strength of wireless communications carried out by using the electromagnetic coupler of FIG. 2 is relatively low over a long distance, and the electromagnetic coupler of FIG. 2 is suitable for near-field wireless communications.

As described before, the electromagnetic coupler 10 of the present invention includes: the conductor pattern 11 formed in the first conductor layer; the feed pattern 13 formed in the second conductor layer parallel to the first conductor layer, the feed pattern 13 being connected to the feeding system 12; the ground pattern 14 formed separately from the feed pattern 13 on the second conductor layer, the ground pattern 14 being grounded; the first linear conductor 15 formed perpendicularly to the first conductor layer and the second conductor layer, the first linear conductor 15 connecting the conductor pattern 11 and the feed pattern 13; and the plurality of second linear conductors 16 formed perpendicularly to the first conductor layer and the second conductor layer, the plurality of second linear conductors 16 connecting the conductor pattern 11 and the ground pattern 14. In the electromagnetic coupler 10 of the invention, the conductor pattern 11 is symmetrical in shape with respect to the connection point A between the conductor pattern 11 and the first linear conductor 15, and the plurality of second linear conductors 16 are symmetrical in position with respect to the first linear conductor 15 in a planar view.

Because the plurality of second linear conductors 16 are formed in the electromagnetic coupler 10, the amplitude of longitudinal waves that occur in the electromagnetic coupler 10 as a whole can be maintained even when the amplitude of longitudinal waves originating from each of the second linear conductors 16 diminishes as a result of reducing the thickness of the electromagnetic coupler 10. Consequently, a high coupling strength can be maintained.

Because the plurality of second linear conductors 16 operate as short stubs in the electromagnetic coupler 10, the impedance characteristics are gradual, and the available frequency band is kept wide even when the thickness of the electromagnetic coupler 10 is reduced.

Also, since the plurality of second linear conductors 16 operate as short stubs, it is required to increase the size of the conductor pattern 11 (225λ/1000 to 450λ/1000 per side in this embodiment) and the distance between the first conductor 15 and each of the second linear conductors 16 (75λ/1000 to 225λ/1000 in this embodiment) in order to obtain a matching condition equivalent to that in the case with an open-stub electromagnetic coupler. On the other hand, in the electromagnetic coupler 10, the distance between the first linear conductor 15 and each of the second linear conductors 16 can be increased, and the plurality of second linear conductors 16 are formed such that they are symmetrical in position with respect to the first linear conductor 15. As a result, the arrangement of the second linear conductors 16, which are the source of longitudinal waves, extends over a wide area, expanding the coupling range. Accordingly, even when a small shift occurs in the positions of the electromagnetic coupler 10 on the transmitter side and the electromagnetic coupler 10 on the receiver side, information can be transferred. This contributes to the improvement in convenience.

In addition, since the plurality of second linear conductors 16 are formed such that they are symmetrical in position with respect to the first linear conductor 15, traverse waves generated by the electric currents flowing through the conductor pattern 11 cancel each other, making it possible to control the occurrence of traverse waves including radiation electric fields. Moreover, because the thickness of the electromagnetic coupler 10 can be reduced, traverse waves originating from the second linear conductors 16 can be controlled. The comparison between Eq. (1) and Eq. (2) described above indicates that the amplitude of traverse waves is half as large as that of longitudinal waves. Therefore, the amplitude of traverse waves can be significantly diminished by reducing the thickness of the electromagnetic coupler 10 (namely, reducing the length of the second linear conductors 16). Consequently, the electromagnetic coupler 10 thus fabricated does not interfere with other wireless communications systems and is suitable for near-field wireless communications.

Furthermore, unlike the case with the conventional art, a band pass filter structure is not used in the electromagnetic coupler 10, making it possible to reduce the above-described degradation of information transmission characteristics due to variations in the dielectric constant between electromagnetic couplers. In other words, according to the present invention, there can be provided an electromagnetic coupler whose information transmission characteristics are hardly affected by variations in the dielectric constant with another electromagnetic coupler with which it communicates information. Accordingly, even in the case of an electromagnetic coupler disposed in a covered or cased device including a dielectric, the degradation of the information transmission characteristics can be reduced, which allows the electromagnetic coupler to be easily applied to a wider range of information communication devices.

Besides, in conventional electromagnetic couplers, an electrode, a series inductor, a parallel inductor, and a capacitance are required to form a band pass filter, and the electrode is disposed on a layer independent of the series inductor, the parallel inductor, and a ground pattern. One method to obtain this configuration includes the steps of: forming a series inductor and a parallel inductor on one layer of a two-layer printed circuit board; forming a ground pattern on the other layer of the two-layer printed circuit board; and connecting an electrode to these layers. Another method includes the steps of: forming an electrode, a series inductor and a parallel inductor, and a ground pattern on a first layer, a second layer, and a third layer, respectively, of a three-layer printed circuit board; and connecting the electrode and the inductors by linear conductors. However, these methods complicate the structure of an electromagnetic coupler, and thus can be costly.

Meanwhile, according to the present invention, the electromagnetic coupler 10 can be fabricated by using the two-layer printed circuit board 17, such as an FR4 printed circuit board. Consequently, the electromagnetic coupler 10 in accordance with the present invention is simple in structure and can be fabricated at low cost.

Generally, in the case of an electromagnetic coupler disposed in a device, the frequency characteristics of the electromagnetic coupler needs to be adjusted according to the space and the environment in which the electromagnetic coupler is disposed. On the other hand, according to the present invention, because forming a band pass filter is left out of consideration in designing the electromagnetic coupler 10, it is possible to easily make matching adjustments with the feeding system 12, while maintaining a capacity to transmit information equivalent to the conventional art. In other words, it is possible to reduce the time required for these adjustments and thus possible to provide the optimal electromagnetic coupler 10 speedily.

It will be appreciated that the present invention should not be considered limited to the embodiment described above and various changes and modifications may be made by those skilled in the art without departing from the technical concept and scope of the present invention.

For example, although two second linear conductors 16 are formed in the proximity of each of the four sides of the square-shaped conductor pattern 11 (namely, eight second linear conductors 16 in total) in the above-described embodiment, the number and arrangement of the second linear conductors 16 should not be considered limited to these. As long as a favorable matching condition can be achieved with respect to the feeding system 12 with the input impedance, one second linear conductor 16 may be formed in the proximity of each of the square-shaped conductor pattern 11 (namely, four second linear conductors 16 in total) as is the case with the electromagnetic coupler 71 shown in FIG. 7.

Figure 7:
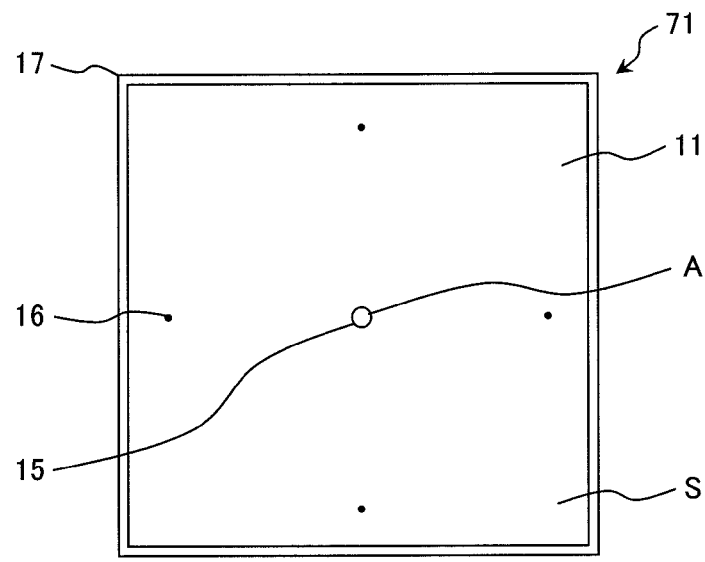
FIG. 7 is schematic illustrations of a modification of the electromagnetic coupler of FIG. 1.
Figure 7:
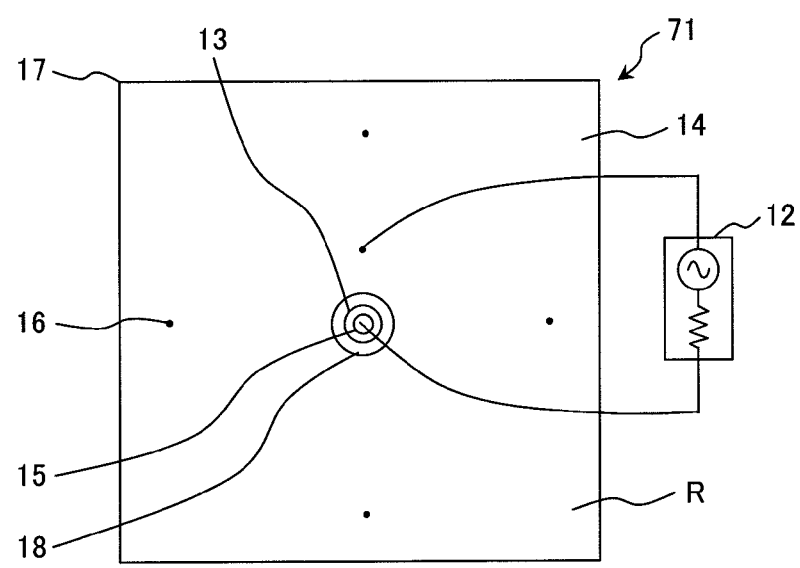

FIG. 7 is schematic illustrations of a modification of the electromagnetic coupler of FIG. 1. FIG. 7(a) shows a plan view of a first conductor layer of the electromagnetic coupler; and FIG. 7(b) shows a perspective plan view of a second conductor layer of the electromagnetic coupler as viewed from the first conductor layer side. An electromagnetic coupler 71 can be obtained at lower cost, since the number of through holes can be reduced by four as compared to the electromagnetic coupler 10 shown in FIG. 1.

In addition, although the conductor pattern 11 is configured into a shape of a square in the above-described embodiment, the conductor pattern 11 may be formed in the shape of a circle or a polygon as long as it is symmetrical in shape with respect to the connection point A with the first linear conductor 15.

Moreover, although the conductor pattern 11 is formed in the first conductor layer (on the front side) S of the two-layer printed circuit board 17, and the feed pattern 13 and the ground pattern 14 are formed in the second conductor layer (on the back side) R of the printed circuit board 17 in the above-described embodiment, any two layers of a three- or more-layer printed circuit board may be used. Also, the electromagnetic couplers 10 and 71 are fabricated using the two-layer printed circuit board 17 in the above-described embodiment, and can also be fabricated using a conductor plate of copper, iron, etc. instead of the printed circuit board 17.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An information communication device including an electromagnetic coupler for communicating information by using at least one of an electrostatic field and an induced electric field, the electromagnetic coupler comprising:
   a conductor pattern formed in a first conductor layer;
   a feed pattern formed in a second conductor layer parallel to the first conductor layer, the feed pattern being connected to a feeding system;
   ground pattern formed separately from the feed pattern in the second conductor layer, the ground pattern being grounded;
   a first linear conductor formed perpendicularly to the first conductor layer and the second conductor layer, the first linear conductor connecting the conductor pattern and the feed pattern; and
   a plurality of second linear conductors formed perpendicularly to the first conductor layer and the second conductor layer, the plurality of second linear conductors connecting the conductor pattern and the ground pattern;
   wherein:
   the conductor pattern is symmetrical in shape with respect to a connection point between the conductor pattern and the first linear conductor;
   the plurality of second linear conductors are symmetrical in position with respect to the first linear conductor in a planar view;
   the first conductor layer is one side of a printed circuit board;
   the second conductor layer is the other side of the printed circuit board;
   each of the first linear conductor and the plurality of second linear conductors is a conductor formed inside a through hole formed in the printed circuit board,
   the printed circuit board has a relative dielectric constant from 4.0 to 5.0 and a thickness from $6\lambda/1000$ to $45\lambda/1000$ with respect to a wavelength $\lambda$ of a central frequency of a frequency band of interest of the electromagnetic coupler;
   a distance from the connection point between the conductor pattern and the first linear conductor to a connection point between the conductor pattern and each of the second linear conductors is from $75\lambda/1000$ to $225\lambda/1000$; and
   the conductor pattern is configured into a shape of a square with a side ranging from $225\lambda/1000$ to $450\lambda/1000$ in length.

2. The information communication device according to claim 1, wherein:
   the ground pattern is configured around the feed pattern; and
   the conductor pattern is arranged to face the feed pattern and the ground pattern.

3. An electromagnetic coupler comprising:

a conductor pattern formed in a first conductor layer;

a feed pattern formed in a second conductor layer parallel to the first conductor layer, the feed pattern being connected to a feeding system;

a ground pattern formed separately from the feed pattern in the second conductor layer, the ground pattern being grounded;

a first linear conductor formed perpendicularly to the first conductor layer and the second conductor layer, the first linear conductor connecting the conductor pattern and the feed pattern; and a plurality of second linear conductors formed perpendicularly to the first conductor layer and the second conductor layer, the plurality of second linear conductors connecting the conductor pattern and the ground pattern;

wherein:

the conductor pattern is symmetrical in shape with respect to a connection point between the conductor pattern and the first linear conductor;

the plurality of second linear conductors are symmetrical in position with respect to the first linear conductor in a planar view;

the first conductor layer is one side of a printed circuit board;

the second conductor layer is the other side of the printed circuit board;

each of the first linear conductor and the plurality of second linear conductors is a conductor formed inside a through hole formed in the printed circuit board, the printed circuit board has a relative dielectric constant from 4.0 to 5.0 and a thickness from $6\lambda/1000$ to $45\lambda/1000$ with respect to a wavelength $\lambda$ of a central frequency of a frequency band of interest of the electromagnetic coupler;

a distance from the connection point between the conductor pattern and the first linear conductor to a connection point between the conductor pattern and each of the plurality of second linear conductors is from $75\lambda/1000$ to $225\lambda/1000$; and the conductor pattern is configured into a shape of a square with a side ranging from $225\lambda/1000$ to $450\lambda/1000$ in length.

4. The electromagnetic coupler according to claim 3, wherein:

the ground pattern is configured around the feed pattern; and the conductor pattern is arranged to face the feed pattern and the ground pattern.

* * * * *